Figure 1:
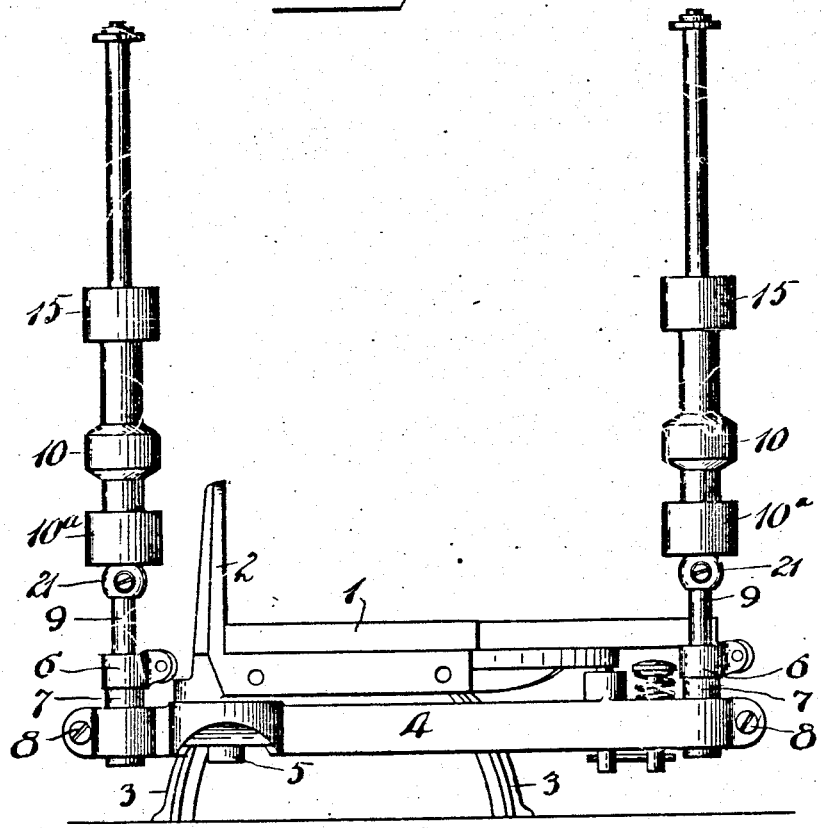

No. 851,841. PATENTED APR. 30, 1907.
E. A. SCHADE.
MITER BOX SAW GUIDE.
APPLICATION FILED MAR. 9, 1907.

2 SHEETS—SHEET 1.

Witnesses: Inventor
E. A. Schade
By his Attorneys

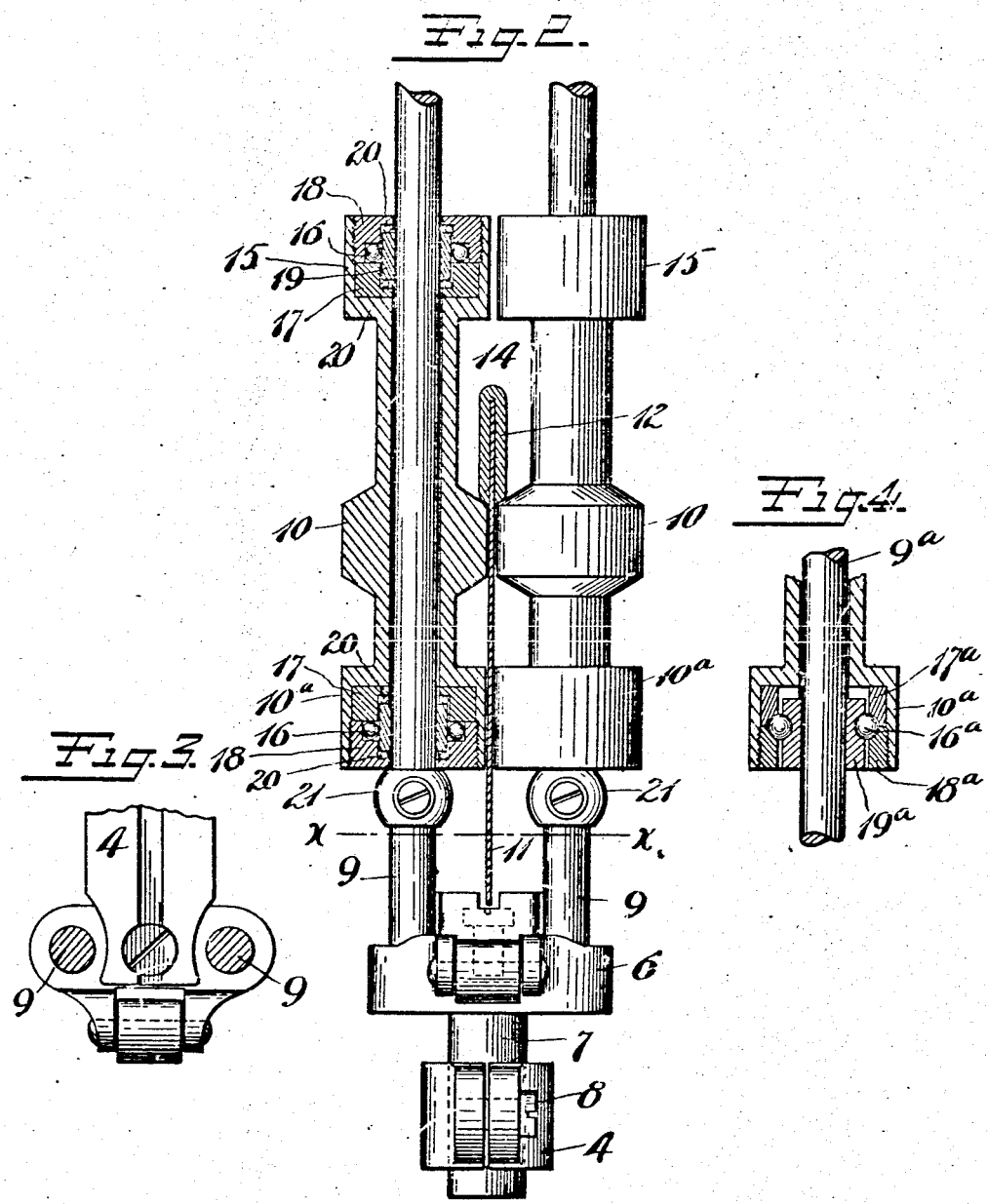

UNITED STATES PATENT OFFICE.

EDMUND A. SCHADE, OF NEW BRITAIN, CONNECTICUT, ASSIGNOR TO STANLEY RULE & LEVEL COMPANY, OF NEW BRITAIN, CONNECTICUT, A CORPORATION OF CONNECTICUT.

MITER-BOX SAW-GUIDE.

No. 851,841.      Specification of Letters Patent.      Patented April 30, 1907.

Application filed March 9, 1907. Serial No. 361,476.

*To all whom it may concern:*

Be it known that I, EDMUND A. SCHADE, a citizen of the United States, residing at New Britain, Connecticut, (post-office address same,) have invented certain new and useful Improvements in Miter-Box Saw-Guides, of which the following is a full, clear, and exact description.

My invention relates to miter boxes, and particularly to an improvement in the saw guide portion thereof.

In the drawings,—Figure 1 is a cross section of the miter box with my invention applied thereto, shown in elevation; Fig. 2 is a relatively enlarged detail view of the saw carrier, of the rolls and bearings for the saw guide in section; Fig. 3 is a section on line of Fig. 2, looking down; Fig. 4 is a section of a modified construction.

Since my invention relates particularly to the saw guide, I need not describe at length the construction of the miter box, to which this guide is applied. It is sufficient to say that 1 represents the floor or work-support of the miter box; 2 the back, slotted in the usual manner to permit the saw to pass through.

3–3 are the usual legs.

4 is the saw carrier arm, pivoted at 5 to swing at the desired angle relatively to the back. At each end of the swinging carrier arm is the saw guide or carrier proper. Each of these guides is constructed as follows: 6 is the base having a downward extension or bearing 7 which fits into a suitable jaw-like opening at the adjacent end of the carrier arm 4. 8 is a set-screw whereby the jaw members may be clamped upon the bearing 7 to hold the base 6 at the desired angle of adjustment. Extending upwardly from the base 6 are two rods 9–9, preferably connected at the top. Each of said rods bear a roller, each roller being capable of rotation as well as vertical movement thereon to permit the saw to be reciprocated and to rise and fall.

In the preferred form, each roller is provided with two bearings hub 10, 10ª which stand against the side of the saw blade 11.

12 is a saw back which is arranged to pass through the space 14.

15 is a third hub on the upper end of each guide roll.

In devices of this type, the degree of snugness with which the opposite rolls of a single set are caused to embrace the opposite side of the saw blade 11, depends upon the angle of the base 6 relatively to the arm 4. In the ordinary construction, when this base 6 is so adjusted to press the roll very tightly against the opposite sides of the saw a considerable friction is developed, tending to retard the freedom of rotation of each of the rolls as the saw is reciprocated. In order to reduce this, I provide ball bearings, and, in this instance, of a special type in the upper and lower ends of each roll. One form of this ball bearing is shown in Fig. 2, and it will be sufficient to describe one of said bearings, since they are all similar in this view. 16–16 represent the balls themselves; 17 and 18 are bushings carried in a recess in the end of the roll and taking the outward thrust of the balls 16. One of these bushings 18, for example, may be screw-threaded in the recess in which it stands. 19 is a cylindrical bushing fitted upon the rod 9, so as to slide freely up and down thereon, and it is against the outer wall of this bushing that the inner thrust of the balls 16 is taken. There is a space at the upper and lower edge of the bushing 19, and between the bushings 17 and 18, in which other balls 20 may be located. These balls take the up and down thrust. There is sufficient clearance, of course, between the outer wall and the bushing 19 and the inner walls of the bushings 17 and 18. All these bushings may be made of very hard material to prevent the balls from scoring the surface. In this respect it will be seen that the balls do not directly engage the rods 9, hence there is no danger of scoring the same, no matter what the pressure may be. It should be understood that the bushings 19 may travel freely up and down on the rods 9, as well as rotate thereon.

In the form shown in Fig. 4, I have eliminated the balls 20–20. In this construction 17ª and 18ª are bushings corresponding generally to the bushings 17 and 18, previously described. 16ª are the balls as before. 19ª is the bushing which slides and rotates directly upon the rod 9ª. In this modification it will be seen that substantially the only change involved comprises forming a groove in the periphery of the hardened bushing 19ª, in which the balls 16ª travel.

Consequently, in this form the balls 16ª alone perform the function of the three sets of balls 16, 20 and 20, shown in Fig. 2. In all these forms, it will be observed that the balls are furnished with bearings and the bearings are so constructed as, in effect, to be retainers, so should one of the rollers be removed from its rod, the bearing will not be dismembered. 21 are the usual stop devices, adjustably mounted on the rods 9-9 to limit the downward excursion of each guide roll.

What I claim is,—

1. In a miter box, a frame, a carrier arm pivotally carried thereby, a saw-guide for said arm, said saw-guide including a base, a pair of parallel upright posts carried thereby, a set of companion guide rolls, a passage between said set of rolls, a ball-bearing for each end of each roll, a bushing for each ball-bearing, said bushing being slidable directly upon its post, the balls of each bearing directly engaging said bushing and holding the bushing at all times in such a manner as to cause the same to rise and fall with said roll.

2. In a miter box, a frame, a carrier arm pivoted thereto, a saw-guide for said carrier arm, said saw-guide including a base mounted on said arm, a pair of parallel upright posts carried thereby, a set of companion guide rolls mounted on said rolls, a saw passage between said set of rolls, a ball-bearing for the upper and lower end of each roll each bearing including a bushing slidable directly upon its post, the balls of said bearings engaging directly against the external wall of said bushing.

3. In a miter box, a frame, a carrier box pivoted thereto, a saw-guide, said saw-guide including a base mounted on said arm, a pair of parallel upright posts carried thereby, a set of companion guide rolls mounted on said posts, a saw passage between said set of rolls, a ball-bearing for the upper and lower end of each roll, each bearing including a bushing slidable directly upon its post, the balls of said bearing taking directly against the external wall of said bushing and the peripheral groove in said bushing into which said balls project.

4. In a miter box, a frame, a carrier arm pivoted thereto, a saw-guide for said carrier arm, said saw-guide including a base mounted on said arm, a pair of parallel upright posts carried thereby, a set of companion guide rolls mounted on said posts, a saw passage between said set of rolls, a ball-bearing for the upper and lower end of each roll, said bearings including a bushing slidable directly upon its post, the balls of said bearing taking directly against the external wall of said bushing and also including series of balls at the upper and lower ends of said bushing and arranged to take the end thrust of said roll against said bushing in both directions.

EDMUND A. SCHADE.

Witnesses:
H. S. WALTER,
W. J. WORAM.

It is hereby certified that in Letters Patent No. 851,841, granted April 30, 1907, upon the application of Edmund A. Shade, of New Britain, Connecticut, for an improvement in "Miter-Box Saw-Guides," errors appear requiring correction, as follows: Page 1, line 47, the words "bearings hub" should read *bearing hubs;* same page, line 59, the word "roll" should read *rolls,* lines 96-97, the letters "el on nated" should read *eliminated,* line 97, the word "construct" should read *construction,* line 98, the letters "ge<sup>n-</sup>" should read *gen-,* and line 99, the word "previous<sup>l</sup>y" should read *previously;* and that the said Letters Patent should be read with these corrections therein that the same may conform to the record of the case in the Patent Office.

Signed and sealed this 28th day of May, A. D., 1907.

[SEAL.]

E. B. MOORE,
*Acting Commissioner of Patents.*